United States Patent
Grüninger

(10) Patent No.: US 11,330,827 B2
(45) Date of Patent: May 17, 2022

(54) METHOD AND DEVICE FOR PRODUCING HERB CHEESE

(71) Applicant: Kalt Maschinenbau AG, Lütisburg (CH)

(72) Inventor: Siegfried Grüninger, St. Gallen (CH)

(73) Assignee: Kalt Maschinenbau AG, Lütisburg (CH)

( * ) Notice: Subject to any disclaimer, the term of this patent is extended or adjusted under 35 U.S.C. 154(b) by 0 days.

(21) Appl. No.: 16/903,425

(22) Filed: Jun. 17, 2020

(65) Prior Publication Data

US 2020/0390121 A1 Dec. 17, 2020

(30) Foreign Application Priority Data

Jun. 17, 2019 (CH) .................. 00809/19

(51) Int. Cl.
*A23C 19/09* (2006.01)
*A23C 19/068* (2006.01)
*A23C 19/08* (2006.01)

(52) U.S. Cl.
CPC .......... *A23C 19/09* (2013.01); *A23C 19/0688* (2013.01); *A23C 19/08* (2013.01)

(58) Field of Classification Search
CPC ...... A23C 19/09; A23C 19/0688; A23C 19/08
USPC .......................................................... 426/36
See application file for complete search history.

(56) References Cited

U.S. PATENT DOCUMENTS

| 913,889 | A | 3/1909 | Hershiser |
| 2,815,708 | A | 12/1957 | Pauly |
| 2,846,767 | A | 8/1958 | Hensgen |
| 2,917,827 | A | 12/1959 | Landford |
| 2,942,983 | A | 6/1960 | Sadler |
| 3,098,297 | A * | 7/1963 | De Boer ............. A01J 25/115 425/145 |
| 3,192,626 | A | 7/1965 | Boeuf |
| 3,353,269 | A | 11/1967 | Lambert |
| 3,514,857 | A | 6/1970 | Rossen |
| 3,541,687 | A | 11/1970 | Peters |
| 3,615,587 | A | 10/1971 | Koopmans |
| 3,650,030 | A | 3/1972 | Delamere |
| 3,733,804 | A | 5/1973 | Diersbock |

(Continued)

FOREIGN PATENT DOCUMENTS

| AU | 2005239793 B2 | 2/2008 |
| BR | 9300409 A | 9/1993 |

(Continued)

OTHER PUBLICATIONS

Translation of Kranz (EP-0406899-A1) (Year: 1991).*

(Continued)

*Primary Examiner* — Brent T O'Hern

(74) *Attorney, Agent, or Firm* — Fleit Intellectual Property Law; Paul D. Bianco; Gary S. Winer

(57) ABSTRACT

A method for producing herb cheese, in particular for producing hard cheese, which is enriched with herbs, spices or the like, with the herbs introduced by machine. For this purpose, raw cheese mass having about 80% milk removed is filled into cheese molds, which are preferably arranged in a vat of a cartridge press, and subsequently pressed. At the same time, respectively, herbs, spices or the like are introduced uniformly into the cheese molds parallel to the raw cheese mass.

16 Claims, 5 Drawing Sheets

(56) References Cited

U.S. PATENT DOCUMENTS

| | | | |
|---|---|---|---|
| 3,748,072 | A | 7/1973 | Whelan |
| 3,783,166 | A | 1/1974 | Peters |
| 3,797,980 | A | 3/1974 | Budahn |
| 3,802,332 | A | 4/1974 | Fassbender et al. |
| 3,836,688 | A | 9/1974 | Fischer |
| 3,838,955 | A | 10/1974 | Dubbeld |
| 3,841,210 | A | 10/1974 | Brog |
| 3,973,042 | A | 8/1976 | Kosikowski et al. |
| 4,049,838 | A | 9/1977 | Krueger et al. |
| 4,068,014 | A | 1/1978 | Heimbruch |
| 4,268,528 | A | 5/1981 | Montigny |
| 4,318,684 | A | 3/1982 | Boucher |
| 4,418,616 | A | 12/1983 | Streeter et al. |
| 4,440,073 | A | 4/1984 | Quilliou |
| 4,472,339 | A | 9/1984 | van der Ploeg et al. |
| 4,509,413 | A | 4/1985 | Granberg et al. |
| 4,515,815 | A | 5/1985 | Kosikowski |
| 4,750,415 | A | 6/1988 | Ostemar |
| 4,817,515 | A | 4/1989 | Bjerre et al. |
| 5,052,290 | A | 10/1991 | Nielsen |
| 5,082,681 | A | 1/1992 | Barlow et al. |
| 5,206,496 | A | 4/1993 | Clement et al. |
| 5,794,779 | A | 8/1998 | Weinheimer et al. |
| 5,974,779 | A | 11/1999 | Orscheln et al. |
| 6,026,737 | A | 2/2000 | D'Alterio et al. |
| 6,465,033 | B2 | 10/2002 | Menninga et al. |
| 6,912,949 | B2 | 7/2005 | Brizio |
| 7,757,876 | B1 | 7/2010 | Ditter |
| 8,322,535 | B2 | 12/2012 | Shoham et al. |
| 8,512,792 | B2 | 8/2013 | Spijkerman |
| 8,916,221 | B2 | 12/2014 | Waldburger |
| 9,049,837 | B2 | 6/2015 | Waldburger |
| 9,713,314 | B2 | 7/2017 | Waldburger |
| 9,968,070 | B2 | 5/2018 | Waldburger |
| 10,729,095 | B2 | 8/2020 | Kong |
| 10,785,953 | B2 | 9/2020 | Gruninger |
| 10,785,954 | B2 | 9/2020 | Gruninger |
| 2007/0196537 | A1 | 8/2007 | Winkler |
| 2008/0036112 | A1 | 2/2008 | Gilg |
| 2010/0239730 | A1 | 9/2010 | Ditter |
| 2010/0263551 | A1 | 10/2010 | Pavero |
| 2014/0087014 | A1 | 3/2014 | Waldburger |
| 2014/0087045 | A1* | 3/2014 | Waldburger ............ A01J 25/13 426/478 |
| 2015/0320007 | A1 | 11/2015 | Hamm et al. |
| 2017/0135309 | A1 | 5/2017 | Gruninger |
| 2017/0135310 | A1 | 5/2017 | Gruninger |
| 2017/0303498 | A1 | 10/2017 | Kong |
| 2019/0191659 | A1 | 6/2019 | Waldburger |
| 2020/0053975 | A1 | 2/2020 | Grüninger |

FOREIGN PATENT DOCUMENTS

| | | | |
|---|---|---|---|
| CH | 353573 | A5 | 5/1961 |
| CH | 563142 | | 2/1972 |
| CH | 573142 | B5 | 9/1972 |
| CH | 704208 | A2 | 6/2012 |
| CH | 706999 | A1 | 3/2014 |
| CH | 707000 | A1 | 3/2014 |
| DE | 821572 | C | 7/1949 |
| DE | 878577 | C | 6/1953 |
| DE | 922448 | C | 1/1955 |
| DE | 1030612 | B | 5/1958 |
| DE | 1582967 | A1 | 7/1970 |
| DE | 2823182 | A1 | 12/1978 |
| DE | 2950497 | A1 | 6/1981 |
| DE | 3529895 | A1 | 2/1987 |
| DE | 19613068 | A1 | 10/1997 |
| DE | 29812845 | U1 | 12/1998 |
| EP | 0126861 | A1 | 3/1984 |
| EP | 0350777 | A1 | 1/1990 |
| EP | 0406899 | A1 | 1/1991 |
| EP | 0406899 | A1 * | 1/1991 ............ A01J 25/12 |
| EP | 0 406 899 | B1 | 4/1992 |
| EP | 0543185 | A1 | 5/1993 |
| EP | 0543899 | A1 | 6/1993 |
| EP | 0922448 | A2 | 6/1999 |
| EP | 1269832 | A1 | 1/2003 |
| EP | 1591016 | A1 | 11/2005 |
| EP | 1769676 | A1 | 4/2007 |
| EP | 2710888 | A1 | 3/2014 |
| EP | 2710889 | A1 | 3/2014 |
| EP | 3167709 | A1 | 5/2017 |
| FR | 2146532 | A5 | 3/1973 |
| FR | 2462253 | A5 | 2/1981 |
| FR | 2473840 | A1 | 7/1981 |
| FR | 2527421 | A1 | 12/1983 |
| FR | 2919467 | A1 | 2/2009 |
| FR | 2981827 | A1 | 5/2013 |
| GB | 951746 | A | 3/1964 |
| GB | 1054727 | A2 | 1/1967 |
| GB | 2065487 | A | 7/1981 |
| GB | 2256379 | A * | 12/1992 ........... B09B 3/0058 |
| NL | 8402355 | A | 2/1986 |
| WO | 1992/03297 | A1 | 3/1992 |
| WO | 2004/087513 | A1 | 10/2004 |
| WO | 2013/051950 | A1 | 4/2013 |

OTHER PUBLICATIONS

Derwent abstract for SU876084, published Oct. 1981, 2 pages.
University of Montana, Agricultural Experiment Station Circular #1, 1910; dated Jul. 22, 1939.
European Search Report issued for Application No. 14181770, dated Feb. 9, 2015 (wth machine translation).
Google search results for "Considur fine hole trangular", retrieved Oct. 24,20106 showing article entitled Belts With Interlaced Bards, Welded Wedge Wire Screens From Hein, www.hellotrade.com, 1 page, shown publication date Apr. 29, 2013.
Webpage from Hein Lehrmann website, Considur fine hole sheets, 1 page, retrieved Oct. 24, 2016, publication date prior to Jan. 1, 2013.
European Search Report issued for Application No. 15158045, dated Jul. 14, 2015, 3 pages.
European Search Report issued for Application No. 16194574, dated Feb. 14, 2017, 4 pages.
European Search Report issued for Application No. 16195210.6, dated Mar. 27, 2017, 3 pages.
European Search Report issued for Application No. 17165041, dated Sep. 7, 2017, 2 pages.
European Search Report for European Application EP 20179193 dated Nov. 3, 2020.
For U.S. Appl. No. 15/344,770: Office Actions dated Jan. 24, 2018; Jul. 24, 2018; Feb. 21, 2019; Sep. 25, 2019 Responses dated Mar. 26, 2018; Oct. 24, 2018; May 21, 2019.
For U.S. Appl. No. 15/344,909: Office Actions dated Jan. 24, 2018; Jul. 24, 2018; Feb. 21, 2019; Sep. 25, 2019 Responses dated Mar. 26, 2018; Oct. 24, 2018; May 21, 2019.
For U.S. Appl. No. 15/486,464: Office Action dated Sep. 25, 2019.
For U.S. Appl. No. 16/538,891: Response dated Oct. 22, 2019.
For U.S. Appl. No. 15/344,770: Response dated Dec. 26, 2020 notice of allowance dated Apr. 28, 2020.
For U.S. Appl. No. 15/344,909: responses dated Dec. 26, 2019 notice of allowance dated Jun. 16, 2020.
For U.S. Appl. No. 15/486,464: Response filed Dec. 26, 2019 notice of allowance dated Mar. 31, 2020.
For U.S. Appl. No. 15/344,909: Notice of Allowance dated Jun. 16, 2020.
For U.S. Appl. No. 16/538,891; Office action dated Jun. 8, 2021.
For U.S. Appl. No. 16/538,891; Response filed Aug. 16, 2021.
European Search Report issued for Application No. 13183880.7, dated Feb. 4, 2014, 6 pages.
University of Montana, Agricultural Experiment Station Circular #1, 1910; pp. 1-15; dated Jul. 22, 1939.
European Search Report issued for Application No. 14181770, dated Feb. 9, 2015 (with machine translation).
European Search Report issued for Application No. 15158045, dated Jul. 14, 2015 (with machine translation).

(56) References Cited

OTHER PUBLICATIONS

European Search Report issued for Application No. 16194574, dated Feb. 14, 2017 (with machine translation).
European Search Report issued for Application No. 16195210.6, dated Mar. 27, 2017 (with machine translation).
European Search Report issued for Application No. 17165041, dated Sep. 7, 2017 (with machine translation).
European Search Report for European Application EP 20179193 dated Nov. 3, 2020 (with machine translation).

* cited by examiner

METHOD AND DEVICE FOR PRODUCING HERB CHEESE

FIELD OF THE DISCLOSURE

The disclosure relates to a method and device for producing herb cheese, in particular for producing hard cheese, which is enriched with herbs, spices or the like.

BACKGROUND

A device for the industrial production of cheese wheels is known, for example, from EP-A-350777. This comprises a cheese press having a rectangular vat that is open at the top for receiving molds, a column frame for arranging a press head that can be raised and lowered and a distribution head for feeding and metering the raw cheese mass into the molds, and a portal cart that can be moved on the vat for guiding the distribution head and for handling a turning mechanism for the molds. The distribution head here must be manually provided respectively changed. EP-A-406899 shows a further development of such a device, in which the molds are accommodated in cartridges, which in turn are arranged compactly and in rows in the vat. A press head having extrusion dies aligned with the molds for pressing the raw cheese mass is above the molds. The cartridges have a gap-minimizing edge design and a mechanized device is provided for pushing the cartridges.

The raw cheese mass passes through a feed tube, the ends of which are connected to the kettle of a cheese maker or to the distribution head, into the distribution head and from there into the round or square molds which are arranged in the vat of the cartridge press. After the molds have been filled, milk is removed from the raw cheese mass by pressing and the raw cheese can then be removed from the mold.

SUMMARY

The disclosure relates therefore to a method for producing herb cheese and in particular for producing hard cheese, which enables herbs, spices or the like to be introduced mechanically into the raw cheese mass.

Raw cheese mass in cheese molds, which are preferably arranged in a vat of a cartridge press, has whey removed beforehand, is poured out and is subsequently pressed, wherein, at the same time, respectively, herbs, spices or the like are also, in particular, uniformly introduced into the cheese molds parallel to the raw cheese mass.

Preferred embodiments are also disclosed.

The cheese molds are filled by means of a distribution head, which executes a uniform back and forth movement along the vat, so that the herbs and/or spices are also introduced uniformly and possibly "in layers" into the raw cheese mass.

The herbs and/or spices are advantageously mixed with water, stirred uniformly and heated and, after reaching a preset temperature, introduced uniformly into the cheese molds as an herb-water mixture via a filling head.

The herbs and/or spices can be better conveyed to and into the cheese molds by mixing in water and are uniformly distributed in the raw cheese mass.

The volume flow of the spice media will be configured by machine control over all dosing points, depending on the recipe, in a preferred manner, in which individual configuration per dosing point is possible as well.

The disclosed method enables herbs, spices or the like to be introduced mechanically into hard cheese, wherein herbs are well and uniformly distributed in the cheese wheel at the same time, which produces a uniform taste of the cheese. The removal of whey, resp. separation of whey from cheese curd to a large extend, according to the disclosure before the herbs and/or spices are fed, resp. also prevents contamination of the whey with herbs and/or spices. This improves and broadens use of the whey afterwards.

The disclosure further relates to a device for producing herb cheese, comprising cheese molds for filling with raw cheese mass, which cheese molds are arranged in an open vat, in particular in a cartridge press, with which are associated a press head having a plurality of extrusion dies aligned with the cheese molds for pressing the raw cheese mass and a distribution head for flushing in the raw cheese mass, the distribution head being arranged to be movable back and forth along the long sides of the vat, and a filling head for herbs and/or spices mixed with water is associated with the distribution head.

Preferred embodiments are also disclosed.

The distribution head is advantageously coupled to a rotatable articulated tube arrangement for feeding the raw cheese mass from a cheese maker.

The filling head is advantageous provided with metering devices/dosing points or pinch valves, the number of which is matched to the rows of cheese molds which can be arranged in the vat transversely to the direction of movement of the distribution head.

Furthermore, the filling head preferably can be coupled or is coupled to a multi-purpose heater for feeding a water/herb mixture. The multi-purpose heater is at least provided with an agitator, a heating device and a pump for conveying the heated water-herb mixture into the filling head.

The filling head is advantageously connected to the multi-purpose heater by means of a flexible hose and possibly further pipelines.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

Figure 1:
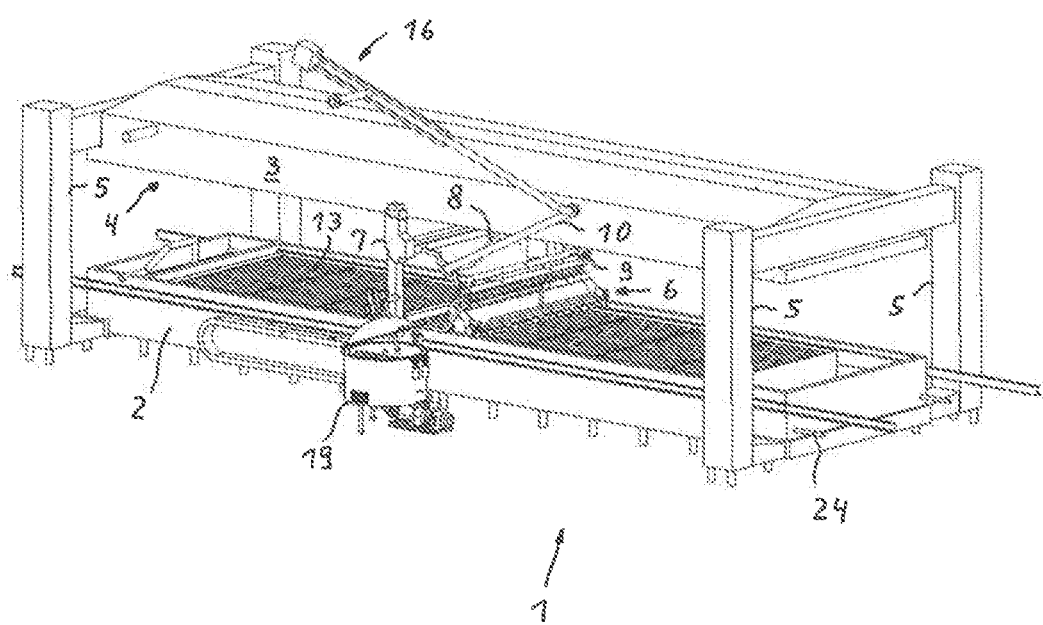
FIG. 1: a cartridge press with the device according to the disclosure.

A cartridge press 1 (FIG. 1) comprises at least in the example presented:
a vat 2 of the cartridge press 1, which vat is rectangular in plan view and open at the top, having cartridges 15 which are rectangular in plan view and open at the top, which are arranged next to one another in rows transverse to the longitudinal direction of the vat 2;
cheese molds 13 which can be arranged in the cartridges for receiving raw cheese mass to be pressed, wherein cheese mold 13 is elongated and rectangular in the example and each consisting of an inner perforated casing and an outer wrapper having at least one outlet for the liquid to be pressed out, and wherein a cartridge preferably comprises six to eighteen molds;

edge sheets, which are arranged at a height of a few centimeters, preferably welded, on the upper edges, the edge sheets forming the outer sides of the cartridge block in the vat 2 in the longitudinal and transverse directions, in order to enable the raw cheese mass to be flushed in above the upper edge of the cartridge;

a press head 3 arranged on end columns 5 having a plurality of extrusion dies 4 aligned with the cheese molds 13 for pressing the raw cheese mass, the press head, for example, being configured in accordance with the disclosure of EP-B-543899, and possibly holddown device for squeezing the press head 3 of the cartridges;

a filling apparatus for flushing in the raw cheese mass, the filling apparatus being arranged on a movable portal cart 7, which can be operated by motor along the long sides of the vat 2;

a device for introducing herbs or spices into the raw cheese mass;

a handling device for lifting, moving and depositing a cartridge on a conveyor device (not shown) outside the vat 2;

a device for rotating/turning (not shown) the cartridges or a row of cartridges about their longitudinal axis;

a vertically movable blow-out device (not shown) having blow-out nozzles, wherein each mold of a cartridge is associated with least one blow-out nozzle so as to empty the cheese wheels onto the conveyor device.

The filling apparatus of the portal cart 7 comprises a distribution head 6 having a dry filler 27 having a number of metering heads 11 which is matched to the number of the cheese molds 13 which can be arranged in a row in the vat 2 (in the longitudinal direction of the vat 2). The distribution head 6 further comprises a distribution tube 9 and a feed tube 8 for feeding and distributing the raw cheese mass to the metering heads 11.

The dry filler 27 comprises an obliquely arranged slotted sieve 28 through which the whey is drained beforehand.

Figure 2:
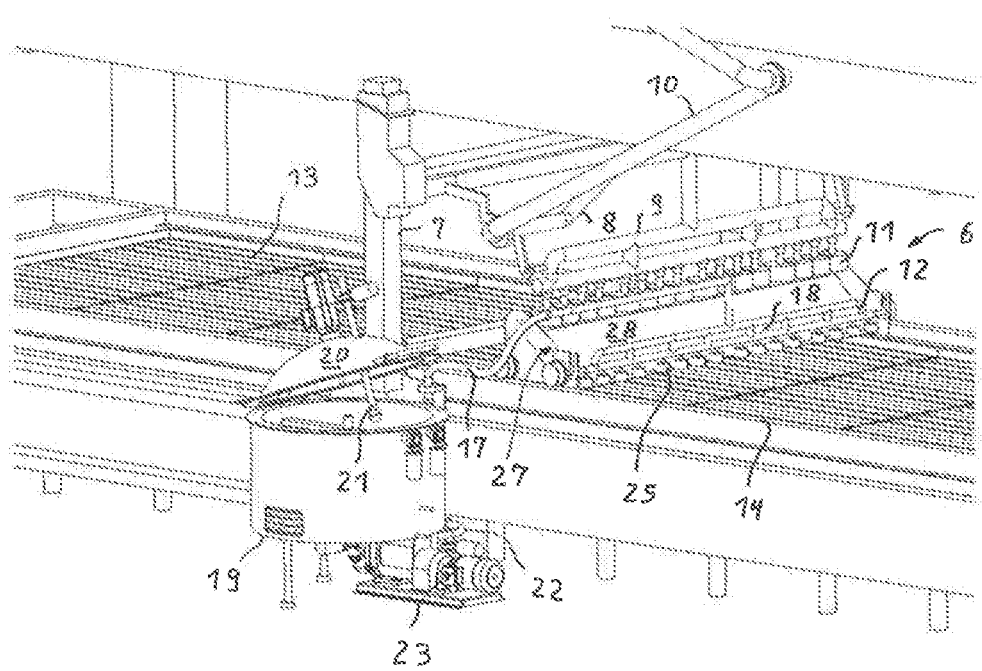
FIG. 2: the device according to the disclosure according to FIG. 1.

The portal cart runs on guides 14 on the long side of the vat 2 (FIG. 2) by means of rollers.

The feed tube 8 of the distribution head 6 is connected, by means of an articulated connection, to a double joint made of two tubular articulated pieces arranged at an angle to one another and pivotally connected to one another. An articulated connection to a tube 10 is made by means of a further articulated connection, the tube being approximately perpendicular to the plane of the vat 2 and being attached to a hitch 16.

It has a connection (not shown) to a cheese maker. The hitch 16 is fastened to a hall ceiling or a high-lying portal.

The portal cart 7 with the distribution head 6 is moved along the longitudinal axis of the vat 2 between the end columns 5 during a filling of the molds. The articulated tube arrangement reproduces this movement without dead centers or misalignments.

The tube 10 is approximately vertical and is constantly filled as a result of the double joint and the articulated connection of the hitch. The raw cheese mass and in particular the curd are uniformly distributed on the molds. There are no angular deviations of the articulated tube arrangement that inhibit product flow.

A channel 26 is arranged on both inner long sides of the vat 2, into which channel whey drained from the dry filler 27 flows and which is discharged for further use by means of a drain pipe 24 on the unloading side of the cartridge press 1.

Figure 3:
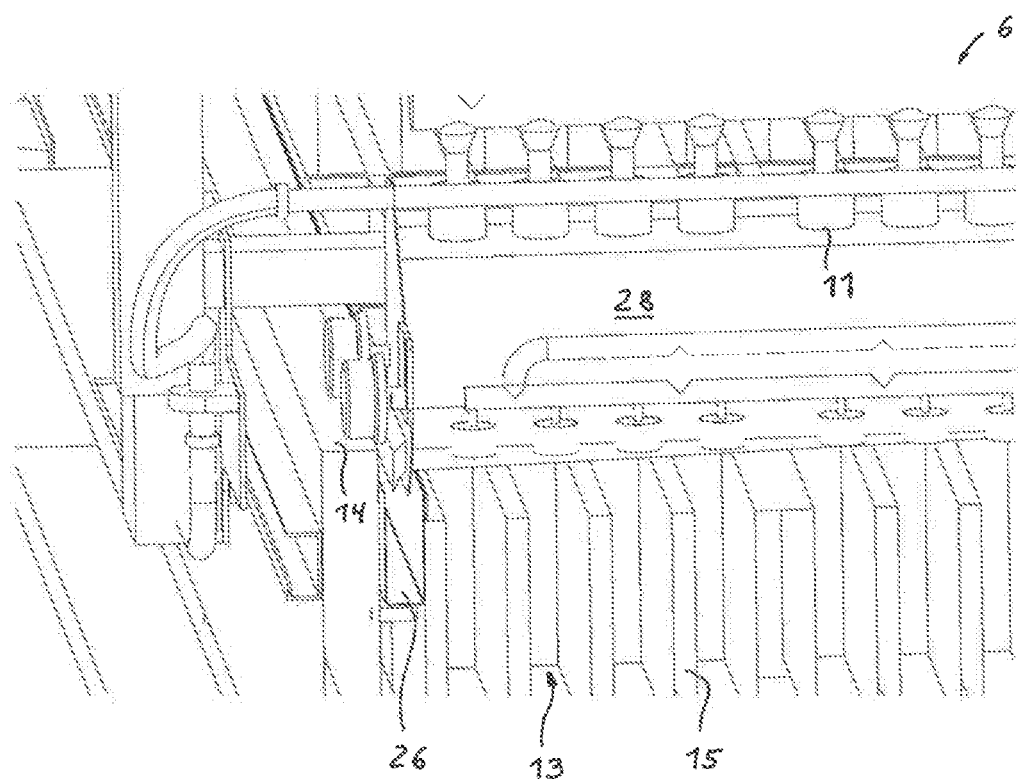
FIG. 3: the device according to FIG. 1 in detail.

The filling head 12 for herbs and spices is constructed analogously to the distribution head 6 for the curd (raw cheese mass). Only the nominal diameters of feed tube 18, distribution tube and metering devices 25 are smaller. In the exemplary embodiment, according to FIGS. 2, 3, the filling head 12 is fastened to the distribution head 6 by means of quick fastening means (not described in more detail) and is accordingly easily removable again. Connected to a multi-purpose heater 19 by means of a flexible hose 17 and a tube 22 which is sufficiently long for the movement. The multi-purpose heater 19 can be closed with a hinged lid 20 and has an agitator 21. A pump 23 is further associated therewith.

A mixture of herbs and water or whey is heated in the multi-purpose heater 19 and pumped through tube 22, hose 17 and distribution tube 18 into the metering device 25 of the filling head 12.

The herbs and/or spices can be conveyed better and are mixed homogeneously by dissolving the herbs and/or spices in water or whey.

The heating of the herbs provided in the multi-purpose heater 19 is used to sterilize them.

The cleaning of the herb preparation, including tube 22, hose 17, distribution tube 18, metering device 25 (or pinch valves 30 according to FIGS. 4 and 5) and filling head 12, can be carried out in a CIP cycle.

A metering head 11 and a metering device/dosing points 25 (or pinch valves 30) are provided for each cheese mold row (in the longitudinal direction of the vat 2) for a uniform distribution of curd (raw cheese mass) and herbs.

Multi-purpose heater 19 and filling head 12 can easily be provided for producing herb cheese, so that the cartridge press 1 is flexible and can also be operated without these elements. Manual operation is possible, but normally automatic operation.

Figure 4:
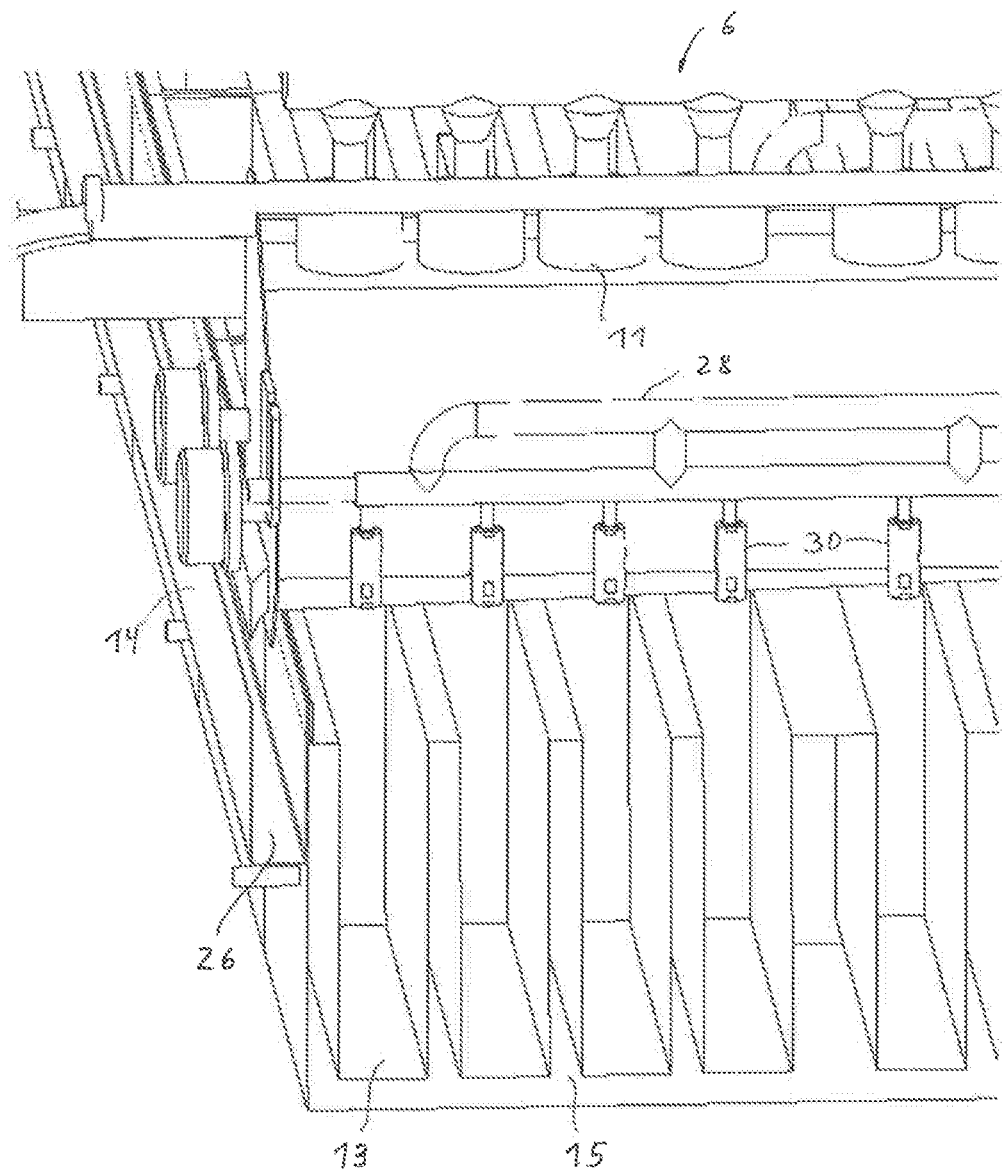
FIG. 4: the device according to FIG. 1 in a second embodiment.
Figure 5:
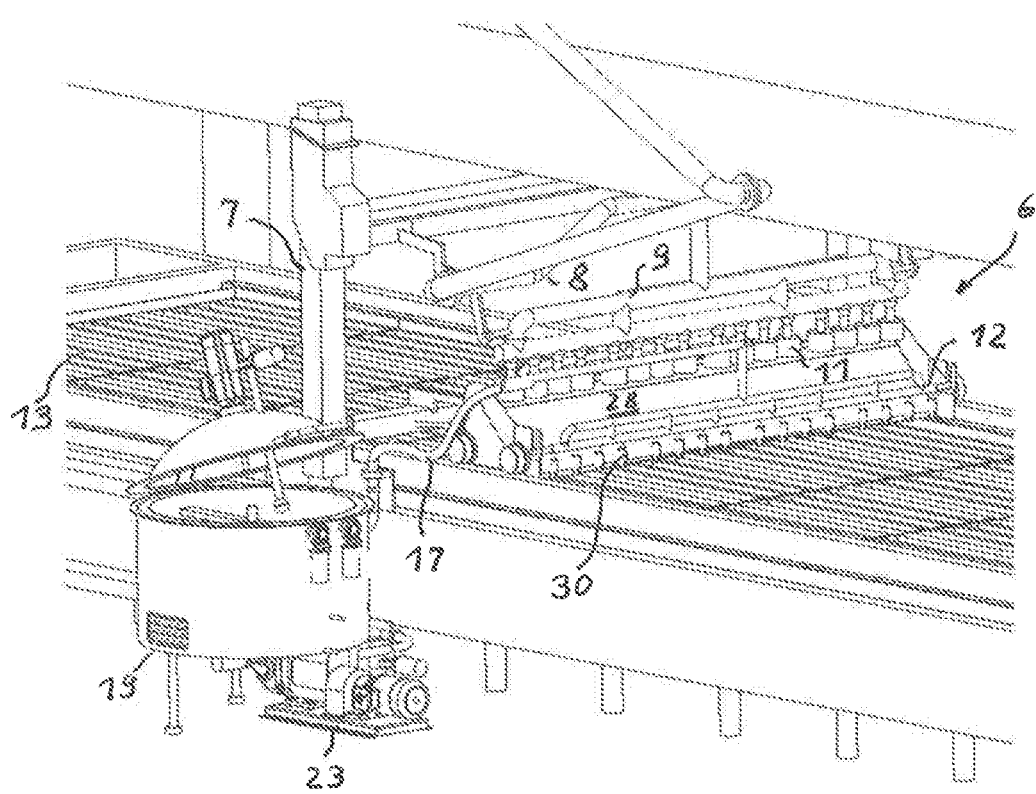
FIG. 5: the device according to FIGS. 1 and 4 in the second embodiment.

In the second embodiment according to FIGS. 4 and 5 pinch valves 30 are depicted in lieu of metering device 25. The water demand of pinch valves 30 for feeding of spices and/or herbs is lower and hence less water has to be pressed out from cheese curd.

The raw cheese mass (curd) is usually provided in a cheese maker (not shown) for the production of herb cheese in the form of hard cheese. In parallel, the multi-purpose heater 19 is filled with a desired amount of water or whey and the desired herbs and/or spices are added. The heater and agitator 21 are switched on after closing the lid 20. If a preset temperature is reached, it is maintained.

If the raw cheese mass is stirred ready, it is pumped from the cheese maker via the articulated tube 10 to the distribution head 6 and the portal cart 7 starts to move back and forth in the longitudinal direction of the vat 2. The raw cheese mass is uniformly applied to the slotted sieve 28 via the metering heads 11 of the distribution head 6 and slides further into the cheese molds 13. The whey runs through the slotted sieve into the interior of the dry filler beforehand and is conducted laterally into the channel 26 and discharged. The pump 23 starts in parallel, so that the water-herb mixture is introduced uniformly ("in layers") via the metering devices 25 into the raw cheese mass, that has had milk removed, directly into the cheese molds 13.

Since approx. 80% of the whey is already removed before the herbs are introduced, the whey is not contaminated and can supplied for a further use. The further feeding of raw cheese mass and herb-water mixture is stopped as soon as the cheese molds 13 are filled with raw cheese mass as intended. In the normal case, cheese maker and multi-purpose heater 19 are filled so that they are emptied when the cheese molds 13 are completely filled.

Whey is then, preferred, completely removed from the raw cheese mass by pressing, agitator 21 and pump 23 are switched off here.

After the cartridges with the cheese molds 13 have been discharged, the cartridge press and herb preparation are cleaned in the usual way by means of hot water in a CIP cycle.

REFERENCE NUMERALS 1 cartridge press
2 vat
3 press head
4 extrusion die
5 end pillar
6 distribution head
7 portal cart
8 feed tube
9 distribution tube
10 articulated tube
11 metering head
12 filling head
13 cheese mold
14 guides
15 cartridge
16 hitch
17 hose
18 distribution tube
19 multi-purpose heater
20 lid
21 agitator
22 tube
23 pump
24 drain pipe
25 metering device
26 channel
27 dry filler
28 slotted sieve
30 pinch valve

What is claimed is:

1. A device for producing cheese by separating whey from a raw cheese mass, comprising:
cheese molds fillable with the raw cheese mass, the cheese molds linearly arranged relative to each other;
a press head having a plurality of extrusion dies each aligned with and sized and dimensioned to enter one of the cheese molds to thereby press the raw cheese mass to remove the whey;
a distribution head for introducing the raw cheese mass to the cheese molds, the distribution head movable linearly along the cheese molds to thereby enable each of the cheese molds to be filled by the distribution head;
a filling head, that is fluidically separate from the distribution head, for introducing at least one of a spice and a herb to the cheese molds, the filling head movable together with the distribution head;
wherein the filling head introduces the at least one of a spice and a herb, mixed with water, into the cheese molds without contaminating the distribution head with the at least one of a spice and a herb, whereby the distribution head introduces uncontaminated raw cheese mass from which the whey is removable that is not contaminated with the at least one of a spice and a herb.

2. The device according to claim 1, wherein the distribution head is coupled to a rotatable articulated tube arrangement for feeding the raw cheese mass produced upstream of the articulated tube arrangement.

3. The device according to claim 1, wherein the filling head is provided with metering devices which measure and control an amount of the at least one of a spice and a herb with water that is admitted to each of the cheese molds.

4. The device according to claim 1, wherein the filling head is fluidically coupled to a vat containing the at least one of a spice and a herb.

5. The device according to claim 4, wherein the vat is provided with an agitator, a heating device and a pump.

6. The device according to claim 4, wherein the filling head is connected to the vat by a hose.

7. The device according to claim 1, wherein the filling head is equipped with a number of dosing points corresponding to a number of cheese molds in a row, each row arranged transverse to a direction of travel of the filling head.

8. The device of claim 1, wherein the distribution head is associated with a dry filler having a slotted sieve for separating the whey that is uncontaminated with the at least one of a spice and a herb from the raw cheese mass.

9. The device of claim 8, further including a channel for draining the whey, separated by the dry filler, to be collected for further use.

10. The device of claim 1, wherein the at least one of a spice and a herb is one or more herbs.

11. The device of claim 1, wherein the at least one of a spice and a herb is one or more spices.

12. The device of claim 3, wherein a number of the measuring devices corresponds to a number of the cheese molds in a row arranged transverse to a direction of travel of the distribution head.

13. The device of claim 3, wherein each of the metering devices is a pinch valve type.

14. The device of claim 1, the filling head and the distribution head controllable to introduce the at least one of a spice and a herb and water into the filling head after uncontaminated whey has been separated from the raw cheese mass using the dry filler.

15. A device for producing cheese by separating whey from a raw cheese mass, comprising:
cheese molds fillable with the raw cheese mass, the cheese molds linearly arranged relative to each other;
a press head having a plurality of extrusion dies each aligned with and sized and dimensioned to enter a cheese mold to thereby press the raw cheese mass to remove the whey;
a distribution head for introducing the raw cheese mass to the cheese molds, the distribution head movable linearly along the cheese molds to thereby enable each of the cheese molds to be filled by the distribution head;
a filling head, that is fluidically separate from the distribution head, for introducing at least one of a spice and a herb to the cheese molds, the filling head movable together with the distribution head;
a vat connected to the filling head by a hose, the vat including a heater for heat sterilizing the at least one of a spice and a herb and water, the vat including an agitator to evenly mix the at least one of a spice and a herb and the water prior to introduction of the evenly mixed the at least one of a spice and a herb and the water into the cheese molds using the filling head as the distribution head and the filling head are linearly moved;
wherein the filling head introduces the at least one of a spice and a herb, mixed with the water, into the cheese molds without contaminating the distribution head with the at least one of a spice and a herb, whereby the distribution head introduces the uncontaminated raw cheese mass from which the whey is removable that is not contaminated with the at least one of a spice and a herb.

16. The device of claim 15, wherein the distribution head is coupled to a plurality of tubes which can be rotated and articulated relative to each other as the raw cheese mass flows through the plurality of tubes to the distribution head, as the distribution head is moved linearly, the plurality of tubes positioned downstream of a downtube extending vertically and which is fluidically connected to an upstream source of the raw cheese mass.

* * * * *